United States Patent [19]

Burney

[11] Patent Number: 4,932,375
[45] Date of Patent: Jun. 12, 1990

[54] MECHANICAL PULLEY FOR AUTOMOTIVE CRUISE CONTROL SYSTEM

[75] Inventor: Charles F. Burney, Orland, Calif.

[73] Assignee: Reeves Brothers, Inc., Grand Prairie, Tex.

[21] Appl. No.: 165,626

[22] Filed: Mar. 8, 1988

Related U.S. Application Data

[63] Continuation-in-part of Ser. No. 78,080, Jul. 27, 1987, Pat. No. 4,746,826.

[51] Int. Cl.⁵ .............................................. F02D 11/10
[52] U.S. Cl. .................................. 123/361; 123/399; 74/513
[58] Field of Search ................. 123/361, 399, 400; 74/501.5 R, 502.6, 513, 517, 626, 781 R; 180/170, 178, 179

[56] References Cited

U.S. PATENT DOCUMENTS

| | | | |
|---|---|---|---|
| 4,320,673 | 3/1982 | Wegert | 74/513 X |
| 4,475,503 | 10/1984 | Nakamura et al. | 123/361 X |
| 4,495,912 | 1/1985 | Yanagisawa et al. | 123/361 X |
| 4,526,060 | 7/1985 | Watanabe | 74/626 |
| 4,727,840 | 3/1988 | Nishida et al. | 123/399 |
| 4,747,380 | 5/1988 | Ejiri et al. | 123/399 |
| 4,787,353 | 11/1988 | Ishikawa et al. | 123/399 |

FOREIGN PATENT DOCUMENTS

| | | | |
|---|---|---|---|
| 3146652 | 6/1983 | Fed. Rep. of Germany | 123/399 |
| 2559209 | 8/1985 | France | 123/399 |
| 0077125 | 5/1983 | Japan | 123/399 |
| 0122742 | 7/1984 | Japan | 123/399 |

Primary Examiner—Willis R. Wolfe

[57] ABSTRACT

A mechanical pulley apparatus for use as part of a vehicular speed control system. A cable is attached to the pulley and the vehicle's throttle so that, when the pulley is rotated by the final ouput element of the control system, movement of the throttle is effected. Incorporated within the apparatus are features which prevent kinking of the cable when the throttle is operated manually and which compensate for the non-linear characteristics of the vehicle's throttle control.

8 Claims, 1 Drawing Sheet

U.S. Patent    Jun. 12, 1990    4,932,375
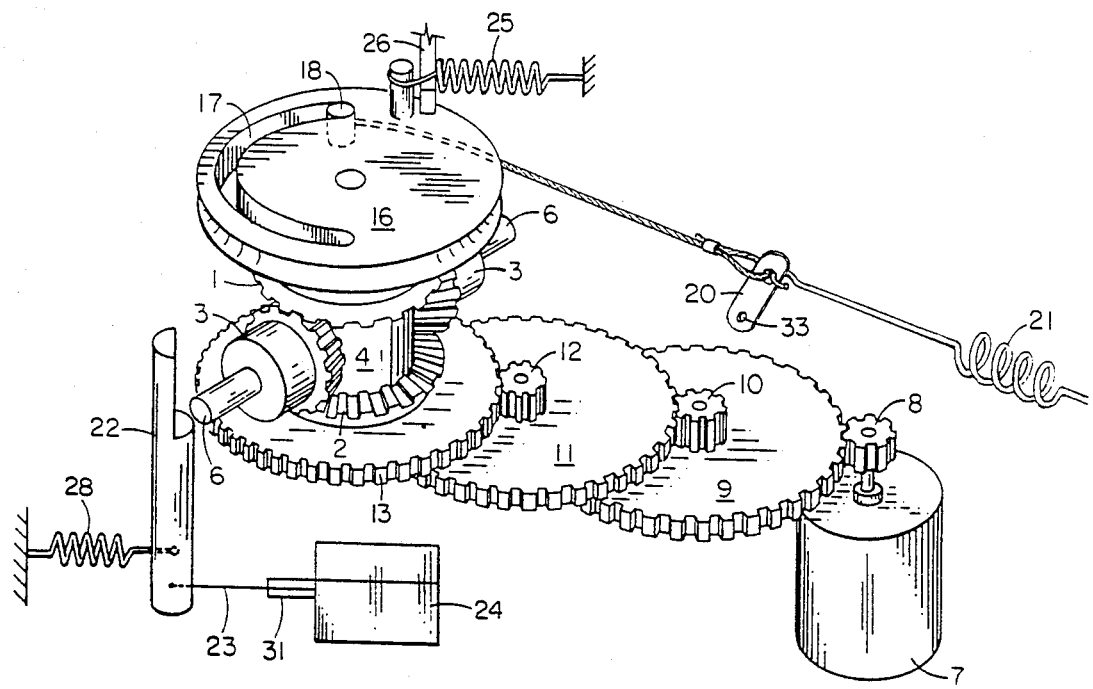
FIG. 1
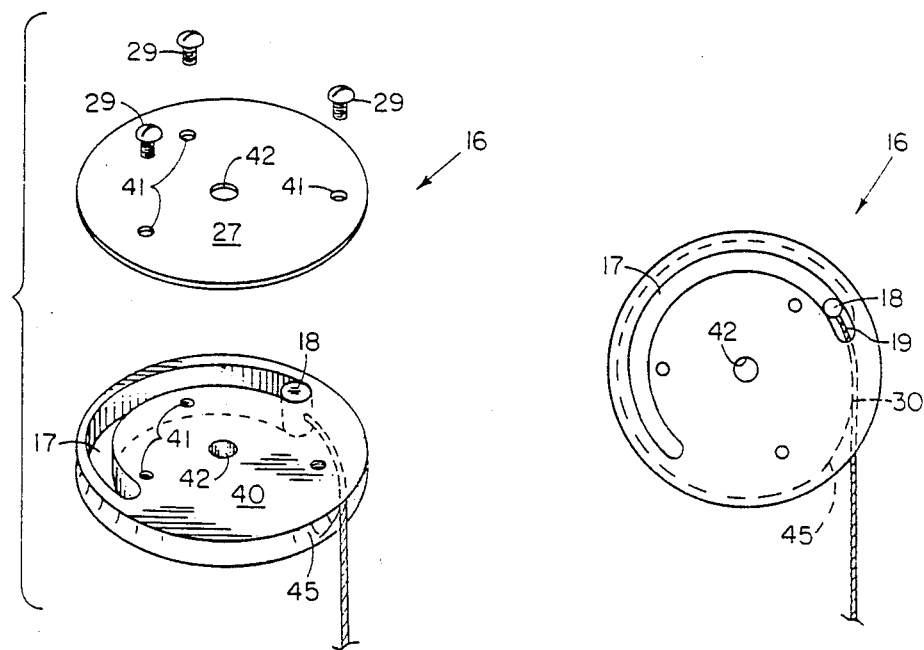
FIG. 2
FIG. 3

MECHANICAL PULLEY FOR AUTOMOTIVE CRUISE CONTROL SYSTEM

This application is a continuation-in-part of Applicant's co-pending application entitled "Electromagnetic Clutch Apparatus", Serial No. 07/078,080, filed on July 27, 1987 now U.S. Pat. No. 4,746,826.

BACKGROUND

The present invention relates to a mechanical pulley arrangement designed specifically to provide a mechanical linkage between the mechanical output of an automotive cruise control system and the vehicle's throttle.

In an electronic cruise control system which makes use of an electric actuator, such as is disclosed in U.S. Pat. No. 4,656,407, the mechanical output of an electric servo motor is mechanically coupled to the vehicle's throttle in order to modify the speed of the engine in accordance with the error signal produced by the control system. As described in Applicant's co-pending application referenced above, the rotation of the servo motor may be coupled via a clutch mechanism to a pulley having a cable attached to the throttle. Rotation of the pulley causes pivoting of the throttle element which, in turn, causes the butterfly valve of the carburetor to open and increase the speed of the engine. A return spring causes the throttle element to close the butterfly valve when tension is removed from the cable, thus reducing the speed of the engine.

One of the problems, however, with electronic cruise control systems is the non-linearity of the throttle control provided in most vehicles. Typically, as aforesaid, the throttle is connected to a butterfly valve located on the carburetor. This butterfly valve serves to control the volume of air/fuel mixture supplied to the engine and thus controls its speed. The valve is capable of movement through 90 degrees, with 0 degrees representing shutoff and 90 degrees representing full power. The non-linearity of this system can be appreciated when it is understood that the movement of the throttle butterfly valve from 0 to approximately 35 degrees represents 80% of the speed attainable by the engine. Thus, the faster a vehicle is operated the more movement of the butterfly valve is required to control the vehicle speed. The converse is also true. The slower a vehicle is driven, the less throttle butterfly movement is required. This non-linearity of the throttle is not a problem when the vehicle is operated manually since a human operator may easily compensate for such non-linearity by adjusting the pressure applied to the accelerator pedal in order to reach and maintain the desired speed.

An electronic cruise control system is, however, a linear one. This means that for a given error in speed the control system will respond with a given throttle correction, regardless of the speed the vehicle is traveling. The amount of correction supplied by the control system to the throttle for a given speed error is defined as the system sensitivity. It is desirable to have a system sensitivity that is low enough so that when the vehicle is operated at low speeds the correction supplied to the throttle by the control system is not so great as to cause surging. Surging occurs when the throttle correction supplied by the control system is great enough to cause the speed of the vehicle to alternately overshoot and undershoot the set point speed due to the throttle being operated in a very sensitive region of its response curve. Thus, to achieve a smooth and stable response, the system sensitivity must be low enough so as to never induce a surging condition in the vehicle. On the other hand, if the system sensitivity is too low, the accuracy and responsiveness of the control system will suffer. If the mechanical characteristics of the system are linear, the solution is to adjust the gain of the control system until the system sensitivity is neither too high nor too low. With a non-linear throttle control, however, the system sensitivity changes with the speed of the vehicle. This means that a gain producing an adequate system sensitivity at high speeds will cause surging of the vehicle at low speeds. Conversely, a gain producing an adequate system sensitivity at low speeds will result in slow and inaccurate control of vehicular speed at higher speeds. One solution to this problem is to design the electronic control system with a variable gain which varies inversely with the sensitivity of the throttle control as the speed of the vehicle changes. However, such non-linear electronic devices increase the cost and complexity of the electronic control system.

It is an object of the present invention to provide a simple and effective mechanical solution to this problem that will compensate for the non-linearity of the throttle by converting it to a near linear system thus matching it to the linear characteristics of the electronics.

SUMMARY OF THE INVENTION

The present invention solves the problem discussed above by making use of a pulley having a spiral surface. The pulley is mechanically coupled to the final rotating output element of the electronic control system, typically an electric servo motor. The pulley has a cable which is attached to the vehicle's throttle element. A return spring maintains the throttle element in an idle position when no force is exerted by the cable. Thus, rotation of the pulley in one direction or the other causes translation of the cable and corresponding travel of the throttle element. For a given amount of rotation of the pulley, however, the extent that the cable is either retracted or let out depends upon the diameter of the pulley. The pulley has, therefore, been designed with a spiral surface so that the effective diameter of the pulley is larger at high speeds and smaller at low speeds. This results in less translation of the cable at low speeds in order to compensate for the greater throttle sensitivity. At higher speeds, on the other hand, the throttle sensitivity is less so the larger effective diameter of the pulley causes greater translation of the cable. In this manner, the non-linear characteristics of the spiral pulley cancel out the non-linear characteristics of the vehicle's throttle control. The result is a linear mechanical system compatible with the linear characteristics of the electronic control system.

An additional feature allows the cable to be taken up by the pulley when the throttle is moved manually toward the idle position. A retaining lug is attached to the end of the cable and is slideably received in a semicircular slot within the pulley. When the retaining lug has slid to the end of the semicircular slot due to rotation of the pulley, further rotation produces tension in the cable and, therefore, motion of the throttle. If the throttle is then moved manually toward the idle position, the retaining lug will be pushed back through the semicircular slot due to the rigidity of the cable. In this way, excessive slack which would tend to cause kinking or snagging is avoided.

Other objects, features and advantages of the invention will become evident in light of the following detailed description when considered in conjunction with the referenced drawing of the preferred embodiment of the present invention. The foregoing and following description of the invention is for exemplary purposes only. The true spirit and scope of the invention is set forth in the appended claims.

BRIEF DESCRIPTION OF THE DRAWINGS

FIG. 1 is a three dimensional perspective drawing of the pulley along with the relevant components of an automotive speed control apparatus of which it is a part.

FIG. 2 is an exploded view of the pulley which is driven by the clutch apparatus to effect changes in the speed of the automobile's engine.

FIG. 3 is a plane view of the pulley.

DETAILED DESCRIPTION OF THE PREFERRED EMBODIMENT

Referring now to FIG. 1, there is shown a depiction of the preferred embodiment of the present invention as part of an electrical actuation apparatus for controlling the speed of an automobile. The apparatus is designed so that actuation of driving motor 7 will cause the automobile engine to speed up or slow down according to the direction which driving motor 7 is made to turn. The rotating shaft of driving motor 7 is non-rotatably connected to spur gear 8. When spur gear 8 is then made to rotate by the rotating shaft of driving motor 7, spur gear 8 drives a gear train comprising gears 9, 10, 11, 12, and 13. Gear 13 is the final output gear of the drive train and is non-rotatably connected to driving bevel gear 2 of the differential gear cluster. Gear 13 rotates about either shaft 5 or another shaft having the same longitudinal axis as shaft 5. As described in Applicant's co-pending application, the rotation of driving bevel gear 2 will cause the rotation of gear hub 4 about shaft 5. Engagement shaft 22 can be positioned to physically engage one of the ends of satellite gear shafts 6, thus preventing the further rotation of gear hub 4 with which satellite gear shafts 6 are connected. The position of engagement shaft 22 is controlled by solenoid 24 acting on solenoid element 31 which is attached to engagement shaft 22 via cable 23. The rotation of engagement shaft 22 caused by solenoid 24 is opposed by spring 28. If gear hub 4 is now prevented from rotating, rotation of driving gear 2 causes rotation of driven bevel gear 1. Driven bevel gear 1 is non-rotatably connected to retract pulley 16 causing retract pulley 16 to rotate in correspondence with driven bevel gear 1.

Throttle 20 of the vehicle's engine is shown in FIG. 1 as being the idle position and maintained there by throttle return spring 21. Throttle 20 pivots about shaft 33 and in so doing, changes the speed of the vehicle's engine. Cable 19 is also attached to throttle 20 at the same point as throttle return spring 21. When the tension in cable 19 exceeds the force exerted by throttle return spring 21, throttle 20 will pivot about shaft 33 toward cable 19 and thereby increase the speed of the engine. Actuator return spring 25 has one of its ends attached to an unspecified immovable structure and the other end attached to pole piece 32 of retract pulley 16. If no other torques are acting upon retract pulley 16, actuator return spring 25 maintains retract pulley 16 in a position defined by the contacting of pole piece 32 with mechanical stop 26. Mechanical stop 26 is an immovable structural component of the apparatus. When driven, gear 1 experiences a torque greater than the torque acting on retract pulley 16 due to actuator return spring 25, retract pulley 16 begins to rotate in a direction which increases the tension in cable 19. Cable 19 is connected to retract pulley 16 by means of retaining lug 18. Retaining lug 18 is attached to cable 19 and is slideably engaged in semicircular slot 17 of retract pulley 16.

If retaining lug 18 has slid to the end of semicircular slot 17 nearest pole piece 32, rotation of retract pulley 16 away from mechanical stop 26 will create tension in cable 19. Driving motor 7 is designed to produce a tension greater than the forces exerted by actuator return spring 25 and throttle return spring 21 which tension, therefore, causes throttle 20 to pivot away from the idle position when driving motor 7 turns in the appropriate direction. When the clutch apparatus is disengaged, actuator return spring 25 serves to return retract pulley 16 to the position where pole piece 32 contacts mechanical stop 26. The torque exerted by actuator return spring 25 on retract pulley 16 in this position also ensures that when the clutch is disengaged, rotation of driving bevel gear 2 produces no rotation of driven bevel gear 1. Throttle return spring 21 then serves to maintain throttle 20 in the idle position unless the throttle is pivoted manually by a means not shown.

Retract pulley 16 is designed so that if throttle 20 is manually pivoted away from the idle position, thereby moving cable 19 toward retract pulley 16, retaining lug 18 will slide in the semicircular slot 17. As shown in FIG. 3, cable 19 passes through aperture 30 as retaining lug 18 slides in semicircular slot 17. Cable 19 is designed to be of sufficient rigidity that, when throttle 20 is manually moved from the idle position, cable 20 can push retaining lug 18 through semicircular slot 17. In this way, excessive slack in cable 19 which could cause kinking or snagging is avoided. Referring to FIG. 2, retract pulley 16 also has attached to it retaining shield 27 by means of screws 29. Retaining shield 27 ensures that cable 19 is constrained within semicircular slot 17 as it pushes retaining lug 18.

As shown in FIGS. 2 and 3, the coiling surface 45 of pulley 16, upon which is coiled cable 19, spirals outward from the point adjacent aperture 30. The effective diameter of pulley 16, therefore, increases as cable 19 is pulled and coiled on the coiling surface 45 owing to the counterclockwise rotation of pulley 16. As throttle 20 is pivoted from an initial idle position as shown in FIG. 1, less incremental rotation of pulley 16 is needed to produce a given incremental pivoting of throttle 20 the farther throttle 20 is moved toward the full-throttle position. Therefore, the non-linear characteristics of the carburetor are cancelled out by the inversely related non-linear characteristics of pulley 16. In fact, by varying the effective diameter of the pulley in this fashion, the functional relationship between throttle travel and angular rotation of the pulley could theoretically be made to be whatever a user desired.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

What is claimed is:

1. An apparatus for actuating the throttle of a motor vehicle as part of, for example, an automatic speed control system, comprising:

a mechanical pulley connected to a means for rotating said pulley;

a cable means attached to both the throttle of the motor vehicle and said mechanical pulley in such manner that rotation of said mechanical pulley in a direction which retracts said cable means results in motion of the vehicle's throttle in a direction which tends to increase the vehicle's speed;

a spring means connected to said mechanical pulley at one end and immovably fixed at the other end, oriented so as to cause said mechanical pulley to rotate in a direction which lessens the tension in said cable means attaching said mechanical pulley to the vehicle's throttle; and a mechanical stop means which stops the rotation of said mechanical pulley due to the torque produced by said spring means at a point at which the vehicle's throttle is in an appropriate idling position.

2. The apparatus of claim 1 further comprising:

a retaining lug attached to said cable means attaching the vehicle's throttle to said mechanical pulley;

a pathway, integrally a part of said mechanical pulley, into which said retaining lug is slideably engaged in such manner as to allow said retaining lug to slide in a direction which prevents excessive slack from forming in said cable means upon the motion of said cable means toward said mechanical pulley; and a mechanical stop means which limits the sliding of said retaining lug and enables said mechanical pulley to produce tension in said cable means attached to the vehicle's throttle upon rotation in the appropriate direction.

3. The apparatus of claim 2 further comprising an aperture continuous with said pathway through which passes said cable means and wherein said mechanical stop means is the wall of said pathway surrounding said aperture.

4. The apparatus of claim 1 wherein the coiling surface of said pulley spirals outward from the point of attachment to said cable means.

5. The apparatus of claim 1 further comprising means for varying the extent of throttle movement per degree of pulley rotation of said pulley is rotated.

6. The apparatus of claim 1 further comprising means for increasing the extent of throttle movement per degree of pulley rotation as said pulley is rotated.

7. The apparatus of claim 2 wherein the coiling surface of said pulley spirals outward from the point of attachment to said cable means.

8. The apparatus of claim 3 wherein the coiling surface of said pulley spirals outward from the point of attachment to said cable means.

* * * * *